Figure 1:
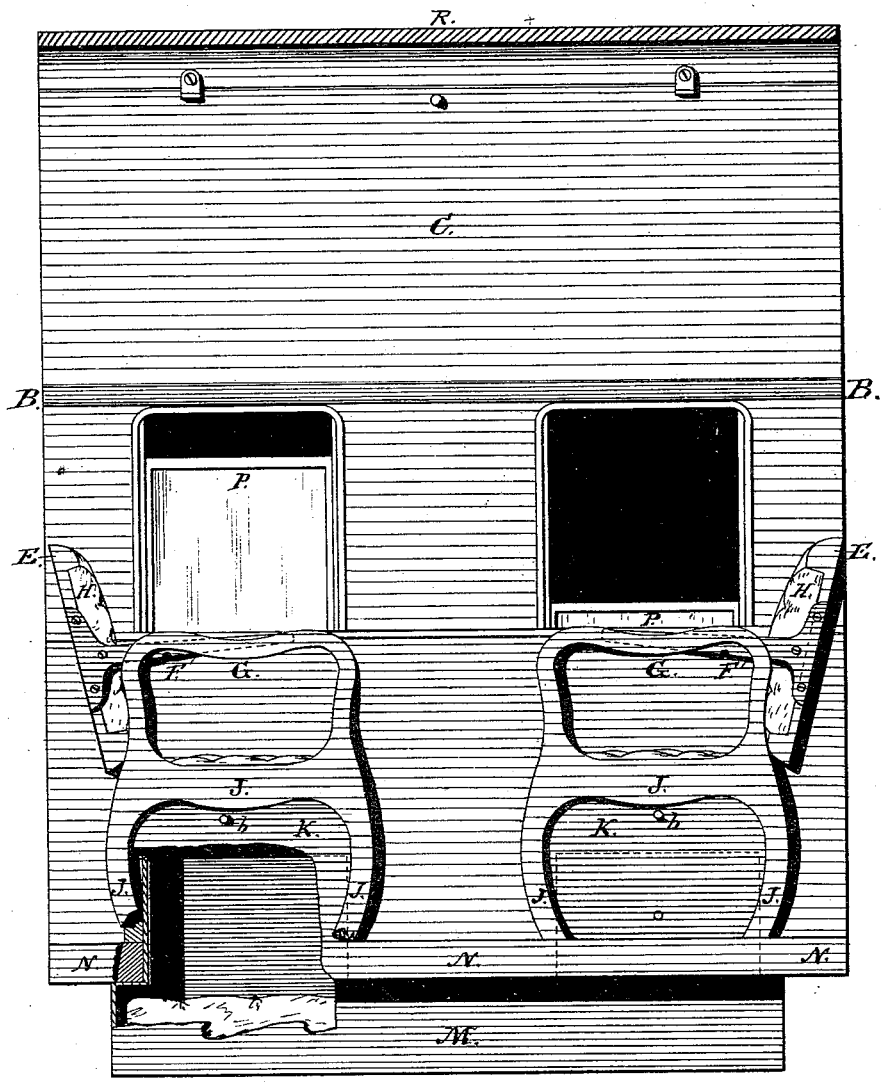

C. E. LUCAS.
Sleeping-Car.

No. 161,249.

2 Sheets--Sheet 1.

Patented March 23, 1875.

WITNESSES
Alonzo Hughes
D. P. Cowl

INVENTOR
C. E. Lucas
By Stansbury & Munn
ATTORNEYS

2 Sheets--Sheet 2.
C. E. LUCAS.
Sleeping-Car.
No. 161,249. Patented March 23, 1875.
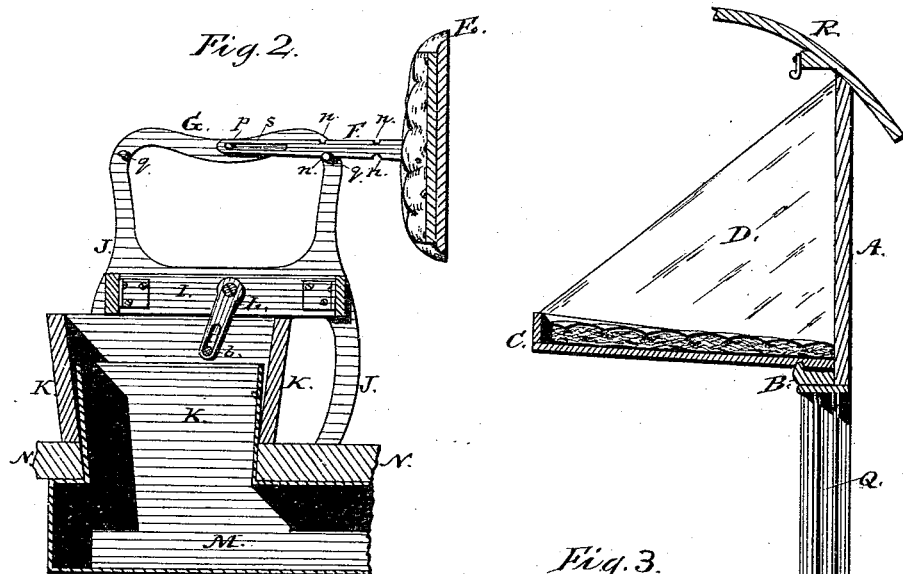
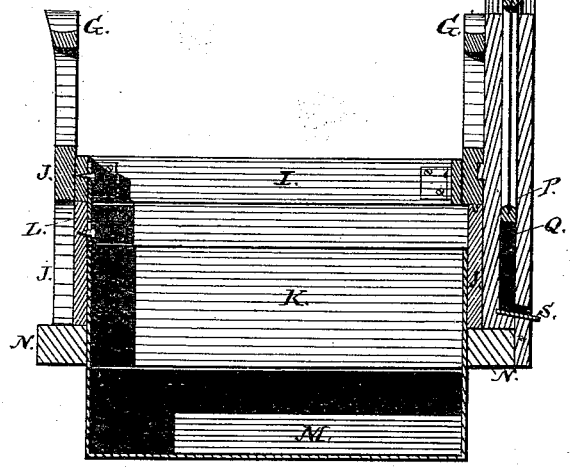
WITNESSES
Alonzo Hughes
D. R. Cowl
INVENTOR
C. E. Lucas
By Stansbury & Munn
ATTORNEYS
THE GRAPHIC CO.PHOTO-LITH.39 & 41 PARK PLACE.N.Y.